Patented Sept. 20, 1949

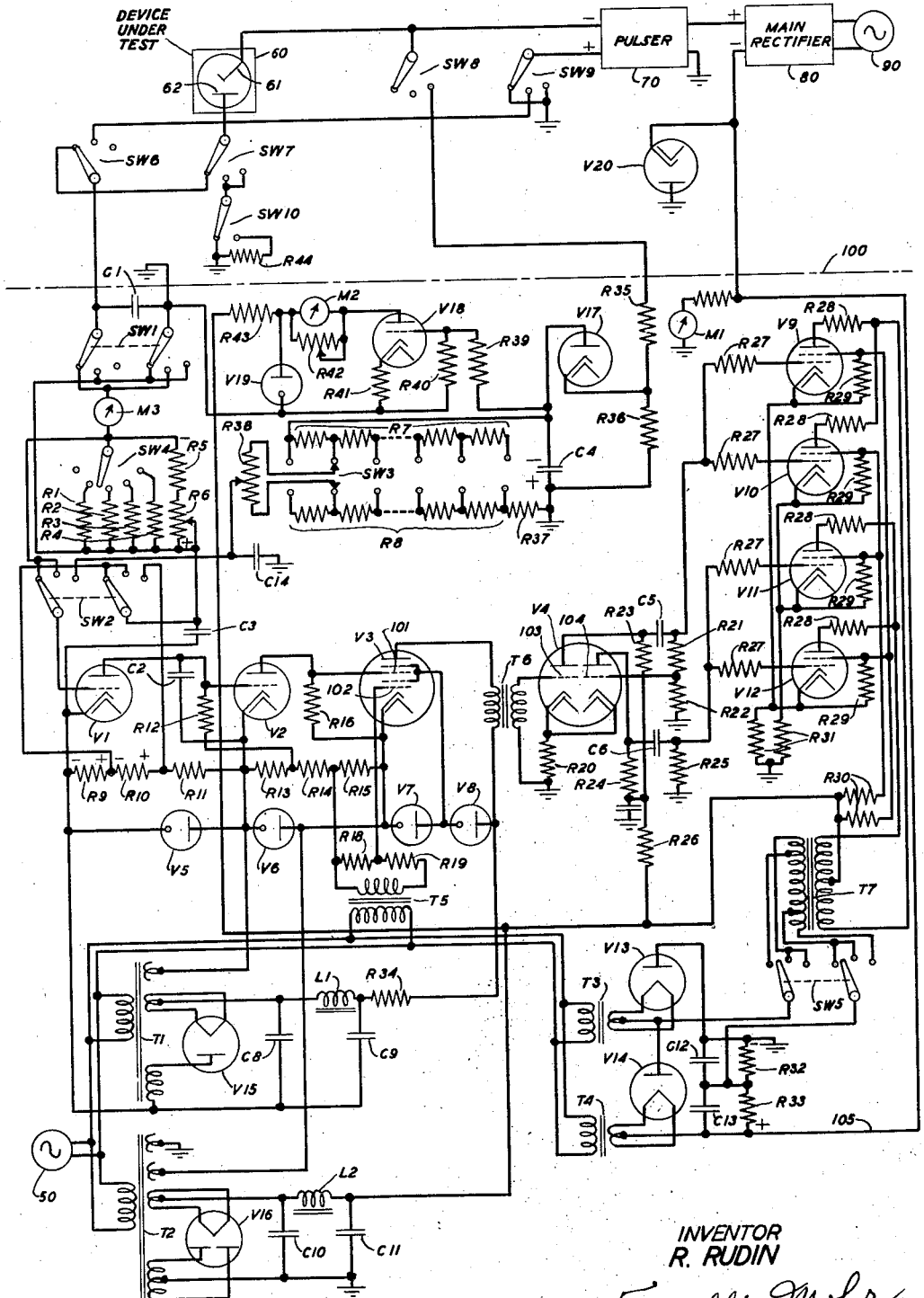

2,482,373

UNITED STATES PATENT OFFICE 2,482,373

STABILIZED SYSTEM

Robert Rudin, New York, N. Y., assignor to Bell Telephone Laboratories, Incorporated, New York, N. Y., a corporation of New York Application July 4, 1945, Serial No. 603,220

7 Claims. (Cl. 250—36)

This invention relates to automatic circuits for the control of current or voltage and more particularly to a control circuit for use in measuring the operating characteristics of high frequency apparatus such as magnetron oscillators.

The rather complex operating characteristics of high frequency circuits are sometimes exhibited by means of performance charts and in the case of magnetron oscillators intermittently energized by pulses of anode current, considerable use is made of a chart known as the Rieke diagram which is a plot showing the variations in efficiency, frequency and anode voltage of a device as a function of the load impedance under the conditions of constant magnetic field and constant average anode current. Here the average anode current means the steady component of the anode current averaged over a large number of pulsations. Holding the magnetic field constant is usually no problem under present practices, but every variation in load impedance or line voltage causes a relatively large variation in the average anode current. The plotting of the Rieke diagram requires a plurality of measurements to be taken under different load conditions. It is found that to maintain the same average anode current for each such measurement requires a considerable amount of labor in readjusting the anode current. In the case of present-day magnetrons, satisfactory measurements for the Rieke diagram require that the average anode current of the magnetron be held constant to within better than one per cent of any desired value over a considerable range of applied voltage and the selected current must remain constant notwithstanding the presence of a standing wave ratio as high as three and with any probable or expected line voltage variation. Laboratory investigations may call for a well-developed Rieke diagram involving a large number of individual measurements. Even in factory production tests the present "frequency pulling tests" involve taking three-point measurements on a Rieke diagram and where this test is repeated on a large number of apparatus units the saving of labor in testing may be of considerable value.

In accordance with the invention, the variations of the average anode current or voltage to be stabilized are utilized to vary the voltage of the supply source of the magnetron or other apparatus under test, to counteract the resulting variation and return the average current or voltage to its normal value. The control system is operative notwithstanding that the supply source does not actuate the magnetron directly but is employed to continuously energize the pulser which in turn generates periodic or intermittent brief pulses of potential upon the anode of the magnetron whereby the latter is made to oscillate intermittently in response to the pulses.

The system of the invention is operative to stabilize the average anode current or anode voltage of the magnetron, which average value is indicative of the high frequency power generated. The variations in the average anode current or voltage are utilized to effect sufficient readjustment of the power input to the pulser to restore the average current or voltage to the selected value.

The scope of the invention is defined in the appended claims, while a preferred embodiment of the invention and a number of circuit variations which may be employed in using the invention are illustrated in the single figure of the accompanying drawing.

Referring to the drawing, reference character 50 indicates a generator or other source of alternating current, which may be a 60-cycle power supply system. The device under test, such as a magnetron or other high-frequency generator, is indicated conventionally at 60, with a cathode 61 and an anode 62. In the arrangement shown, it is contemplated that the anode 62 is operated normally at ground potential or substantially so while the operating potential is employed as a negative potential impressed upon the cathode. The operating potential is supplied by a pulser 70 which is in turn actuated by a main rectifier 80 in conjunction with the control apparatus shown below the dot-dash line 100 in the drawing. A main power supply generator 90, which may be one and the same with the generator 50 supplies the alternating current input for the rectifier 80. A plurality of switches SW1 to SW10 are provided in order that the apparatus illustrated may be employed in several different connections.

In the operation of the arrangement shown in the drawing, the sources 50 and 90, through their respective associated circuits, supply the input for the pulser 70 which latter generates at its output terminals, shown at the left in the drawing, high potential negative pulses of suitable duration, which may be very short. The pulses intermittently energize the device 60 under test. The control circuit below the line 100 in the drawing is essentially a regulated rectifier constituting a direct current supply source of variable voltage, which is connected in series-aiding relation with the output voltage of the main rectifier 80, which constitutes a supply source of nominally fixed voltage. Either the anode return current or the cathode-anode voltage of the device 60 is utilized in the control apparatus to regulate the voltage contributed by the control circuit. The regulation is desired to be in the proper direction to counteract variations in the anode current or voltage of the device 60.

The control system and its operation will now be discussed in detail, first for the case in which it is the average anode current that is to be stabilized. In this case the switches SW1, SW2, SW6, SW7, SW8 and SW9 are each set on the respective left-hand contact. Switch SW10 does not enter into the operation.

By means of switches SW7, SW6, SW1, SW2 and SW4, the anode return circuit of the magnetron 60 is completed through an R. C. network comprising a plurality of resistors R1 to R6, inclusive, shunted by a condenser C1. The value of R can be determined by selecting a position of the switch SW4 and adjusting R6 to the desired value. The time constant of the R. C. network may be so chosen that the current pulses, through the magnetron, produce substantially a direct current voltage in R containing only a slight ripple of the pulse recurrent frequency, which latter frequency is determined by the pulser 70. The pulse recurrent frequency may be of the order of 800 cycles per second or any suitable frequency above or below.

The direct current or control voltage across R is impressed between the control grid and cathode of a vacuum tube V1, in opposition to a fixed voltage obtained from the drop in resistor R9. The resistor R9 is a part of a bleeder circuit supplied with rectified current from the source 50 by way of a rectifier V15 and the anode-cathode path of a modulator tube V3. The bleeder comprises resistors R9, R10, R11, R13, R14 and R15 connected between the cathode of V3 and the cathode of V1. The tube V1 and a similar tube V2 comprise a two-stage direct coupled, direct current amplifier for amplifying the difference between the control voltage and the fixed bias. Fluctuations in the direct current voltage across R, after being amplified, are impressed upon a grid 101 in the tube V3. Upon another grid 102 of the tube V3 is impressed the alternating power voltage from the generator 50 by way of a suitable transformer T5 and resistors R18 and R19. A direct current bias is generated by R15. The output of the tube V3, which acts as a modulator, will comprise a power frequency wave the amplitude of which is controlled by the average anode current of the magnetron 60.

The output of the tube V3, which will ordinarily be a 60-cycle wave of variable amplitude, is impressed by means of a transformer T6 upon one of the grids 103 of a double triode V4. The other grid 104 may be excited through a condenser C5 and potential divider resistances R21 and R22 to operate the tube V4 as a phase inverter in known manner for converting the single phase input upon the grid 103 into voltages equal in magnitude but 180 degrees apart electrically which may be amplified and impressed upon a push-pull amplifier. In the system illustrated, the push-pull alternating current amplifier comprises tubes V9 and V10 on one side and V11 and V12 on the other, the grids of which are joined in pairs through resistors R27 and the pairs are connected in the plate circuit of the respective triodes in the tube V4. The output wave from the push-pull amplifier, which may be 450 volts to 600 volts or higher in maximum amplitude, is applied to a coupling transformer T7, the voltage transformation ratio of which may be changed to any one of a plurality of values by means of a switch SW5. The output voltage from the transformer T7 is impressed upon a rectifier, which may be a voltage doubled circuit as shown, employing tubes V13 and V14 to charge a pair of condensers C12 and C13 in series-aiding connection to generate a high direct current voltage between a lead 105 and ground. This voltage is connected in series with the output of the main rectifier 80 and may be measured by means of a voltmeter M1. Supply voltages for the tubes V1, V2 and V3 are provided by the rectifier V15 which obtains power from the source 50 through a transformer T1. The tubes V4 and V9 to V12, inclusive, receive supply voltages from a rectifier V16 which is actuated from the source 50 through a transformer T2. The heater elements for all the tubes may be supplied with current from the transformers T1 and T2 as indicated by extra windings on the transformers. The connections from the heater windings to the heater elements in the tubes have been omitted in order to avoid needless complexity in the drawing.

Because the magnetron input impedance as presented to the pulser varies with the high frequency load upon the magnetron, in the course of taking measurements for the Rieke diagram, the input voltage to the pulser must be varied in whatever manner is necessary to compensate for the load changes. At some value of the load impedance, not necessarily known, the magnetron will present a maximum input impedance to the pulser. The input control of the stabilizing circuit may be set so that under the condition of maximum input impedance the control circuit is adding to the voltage of the main rectifier only slightly less than the maximum voltage of which the control circuit is capable. When the high frequency load connected to the magnetron is a matched transmission line, the input impedance presented by the magnetron to the pulser will be less, and the stabilizing circuit will be called upon to contribute substantially less than its maximum voltage. In the case of a certain type of magnetron which has been frequently tested, it has been found convenient to adjust the input control so that the stabilizing circuit adds about 600 volts, when the transformer T7 is operated with a one-to-one voltage transformation.

When the average current through the magnetron anode 62 increases, the grid of the tube V1 becomes more negative. Because of a phase reversal in each of the tubes V1 and V2, the potential of the modulator grid 101 changes in the same phase as the grid of V1 and the output of the modulator V3 decreases. This in turn decreases the output of the rectifier, bringing about a lower voltage between the lead 105 and ground. This lowers the total voltage impressed upon the pulser 70, which in turn decreases potential of the pulses impressed upon the magnetron 60 and lowers the anode current therefrom. Similarly, when the current through the magnetron decreases, the voltage output of the stabilizer increases and in either case the change continues until the average magnetron anode current assumes a value which is very close to the initial value.

Because a high gain may be introduced by the direct current amplifier V1, V2, a very slight change in the magnetron current is sufficient to actuate the stabilizer and thus to obtain the necessary output voltage. In a typical case in which a Rieke diagram was taken on a magnetron, the average magnetron current with no standing wave in the magnetron load circuit was 10 milliamperes. When a condition was secured in which a standing wave ratio of 1.5 was observed in the magnetron load circuit and the phase of the voltage in the load circuit was varied through the entire range of possible values, the average anode current of the magnetron varied between limits of 11.2 and 9.0 milliamperes when the stabilizer in accordance with the present invention was not employed. Upon connection of the stabilizer and adjustment thereof to deliver the requisite voltage at the lead 105 the magnetron load circuit was again adjusted to operate at 10 milliamperes with no standing wave. When a standing wave ratio of 1.5 was again produced and varied through all possible phases, no variation in the average anode current of the magnetron could be observed on a meter with which 0.05 milliampere readily could have been detected, while the output voltage of the stabilizer varied from approximately 150 volts to 650 volts.

It will be evident that the stabilizer compensates for fluctuations in the supply voltages of the generators 50 and 90, that is, for power line voltage fluctuations, as well as for changes due to the magnetron load circuit. Without the stabilizer in operation it was found, in the test described above, that line voltage fluctuations in the power system, resulting from use of welding apparatus and so forth on the same supply lines, produced fluctuations of from 0.1 to 0.2 milliampere in the magnetron current. When the stabilizer was thrown into operation, no variation of magnetron current could be observed as a result of line voltage fluctuations, although the fluctuating line voltage required compensating variations in the stabilizer output of 100 volts or more which were evidenced by observation of the meter M1. Comparison of measurements made with and without the stabilizer has shown that the use of the stabilizer has no objectionable reaction upon the measurements that are taken in preparing the usual performance charts. Magnetic field fluctuations, if present, are also compensated inasmuch as they in turn tend to produce variations in the magnetron current. It has been found that the convenience of operating under stabilized conditions more than compensates for the necessary complexity of the control system and its adjustments.

Occasional arcs may occur in aging treatment or the breaking in of vacuum tubes, and these arcs may damage the stabilizing apparatus as a result of high transient voltages. To avoid this result, a diode V20 is connected across the output of the stabilizer and permanently heated from the power supply 50 or 90. The anode of this diode is at ground potential so that it will not conduct current when the stabilizer is operated but conducts readily when the stabilizer is switched off, thus producing a low impedance unidirectional shunt to the flow of current from the main rectifier.

Experience has demonstrated that the rectifier tubes V13 and V14 may well be mercury vapor rectifier tubes.

In any stabilizing circuit, as the sensitivity is increased, the tendency of the system to hunt increases. This tendency can be combatted by increasing the capacity of the output condensers C12 and C13.

In some cases it is undesirable to connect the stabilizer between the magnetron and ground as is illustrated in the drawing with the switches set in the positions shown.

To avoid having the stabilizer connected between magnetron and ground the stabilizer may be connected in the return path of the pulser instead, by setting switches SW1, SW2, SW6, SW7, SW8 and SW9 all in the central position. If the switches are not to be shifted in unison or automatically, the switch SW8 need not be changed as it is open both in the left-hand position and in the central position. Likewise, switch SW2 need not be changed.

In the system as now set up, the anode 62 is connected to ground through SW7 and SW10. The positive output terminal of the pulser 70 is connected through SW9 and SW6 to the R. C. circuit by way of SW1. In changing SW1 from the left-hand to the central position, a reversal is effected so that the current from the positive terminal of the pulser flows through the R. C. circuit in the proper direction to impress a negative potential upon the grid of V1 in opposition to the fixed bias as in the former circuit condition above described. It will be noted that in this circuit condition the switch SW2 and the all-direct current amplifying part of the system are at a floating potential both with respect to the direct currents and to the pulse frequency ripple of the applied current. In order to avoid interference and to insure stable operation under these conditions, the transformers T5 and T6 are particularly desirable in the input and output circuits respectively of the tube V3. The switch SW10 and resistor R44 are for use when it is desired to have a small voltage replica available as for connection to a cathode ray oscilloscope for examining the wave form of the pulses.

A third operating condition may be set up by placing the switches SW1, SW2, SW6, SW7, SW8 and SW9 all in the right-hand position. This circuit condition is used for stabilizing the average voltage value of the pulses impressed upon the device under test by the pulser 70. Switch SW9 grounds the positive side of the output circuit of the pulser 70. Switch SW7 grounds the anode 62 through the switch SW10. Switch SW1, left hand blade, is on open contact. Switch SW6 closes a shunt circuit through a potential divider comprising a pair of resistors R35 and R36 which are in parallel with the cathode-anode path of the device 60. By means of the potential divider a small fraction of the pulse voltage charges a condenser C4 through a diode V17. The charge is allowed to leak off through a network of resistors R7, R38, R8 and R37. The time constant of this latter R. C. combination may have any suitable value such as 0.4 second in order to reduce the ripple in the voltage across C4 to a permissible value. A negative voltage is taken off by the sliding contact of the resistor R38, the value of which voltage may be adjusted in steps by means of the switch SW3. The voltage selected is applied to the grid of the tube V1 through the left-hand blade of the switch SW2. The voltage impressed upon the grid of V1 is opposed by a fixed bias across resistors R9 and R10 and operates the stabilizer as described before, a ground connection to the positive terminal of R10 being effected through the right-hand blades of SW1 and SW2. In stabilizing the pulse voltage, a higher degree of sensitivity is desired than in stabilizing the anode current because a small change of pulse voltage causes a relatively large change of anode current. It is to obtain this increase of sensitivity that the resistor R10 is included in the grid biasing circuit of V1 in this circuit condition.

In order to measure the applied pulse voltage, a vacuum tube voltmeter circuit may be provided as shown comprising a pair of tubes V18 and V19 and a meter M2. A constant fraction of the voltage developed across the condenser C4 is applied through a voltage divider comprising resistors R39 and R40 to the grid of the triode V18 and the anode current of this tube is measured by the meter M2 which meter may be calibrated in terms of pulse volts. The meter M2 may be regulated as to sensitivity by a variable shunt resistor R42 and the anode supply potential for the tube V18 may come through the rectifier V16 by way of a resistor R43. The tubes V17 and V18 and associated circuits comprise a two-stage voltage measuring circuit which has the advantage that the voltages impressed upon the diode V17 and the condenser C4 are small compared to those which would be required to effect a voltage measurement without the direct current amplification afforded by the tube V18. Without this amplification, the meter M2 would have to be connected in shunt to the condenser C4 and larger voltages would be necessary to obtain a suitable deflection of the meter. The reduction of the voltages in the measuring circuit permits the use of inexpensive and small condensers and diodes.

What is claimed is:

1. A stabilized system comprising a magnetron having an anode and a cathode, a pulser connected to said cathode and anode for intermittently energizing said magnetron, a resistor connected to said cathode and anode, a direct current supply source connected to said pulser for energizing the same, and control circuits responsive to the current in said resistor, and connected between said resistor and said direct current supply source to regulate the voltage thereof in response to changes in said current to minimize said changes.

2. A stabilized system comprising a magnetron having an anode and a cathode, a pulser connected to said cathode and anode, a resistor connected in series with said cathode and anode, a pair of supply sources connected to said pulser, said sources comprising a direct current supply source of nominally fixed voltage and another direct current supply source of variable voltage connected in series-aiding relation with said source of fixed voltage, and control means connected between said resistor and said direct current supply circuit of variable voltage whereby the voltage of said variable circuit is controlled by the current in said resistor to minimize changes in said current.

3. A stabilized system comprising a high frequency generator, means for intermittently energizing said high frequency generator, a source of electromotive force for continuously energizing said intermittent energizing means, an output circuit for said high frequency generator, an impedance element in said output circuit, and a control circuit connected between said impedance element and said source of electromotive force to regulate the voltage thereof in response to changes in the current through said impedance.

4. A stabilized system comprising a high frequency generator, means for intermittently energizing said high frequency generator, a source of electromotive force for continuously energizing said intermittent energizing means, an impedance element energized by said high frequency generator, and a voltage control device actuated by energy in said impedance element and connected to said source of electromotive force to regulate the voltage thereof.

5. A stabilized system comprising a high frequency generator, a pulser connected to said generator for supplying direct current pulses to said generator thereby to intermittently energize said generator, a direct current supply source connected to said pulser, an output circuit for said high frequency generator, an impedance element in said output circuit, and a control circuit connected between said impedance element and said direct current supply source to regulate the voltage thereof in response to changes in the current through said impedance element.

6. A stabilized system comprising a high frequency generator, a pulser connected to said generator for supplying direct current pulses to said generator thereby to intermittently energize said generator, a direct current supply source connected to said pulser, an impedance element energized by said high frequency generator, and a voltage control device actuated by energy in said impedance element and connected to said direct current supply source to regulate the voltage thereof.

7. A stabilized system comprising a high frequency generator, intermittent energizing means connected to said high frequency generator, continuous energizing means connected to said intermittent energizing means, and a current magnitude responsive control means connecting the output of the high frequency generator to the said continuous energizing means.

ROBERT RUDIN.

REFERENCES CITED

The following references are of record in the file of this patent:

UNITED STATES PATENTS

| Number | Name | Date |
|---|---|---|
| 2,149,080 | Wolff | Feb. 28, 1939 |
| 2,226,288 | Pieplow | Dec. 24, 1940 |
| 2,243,202 | Fritz | May 27, 1941 |
| 2,262,044 | Philpott | Nov. 11, 1941 |
| 2,268,366 | Wolff | Dec. 30, 1941 |
| 2,403,716 | Goldberg | July 9, 1946 |